United States Patent
Lei et al.

(10) Patent No.: US 10,263,328 B2
(45) Date of Patent: Apr. 16, 2019

(54) DEVICE FOR WIRELESS ACCESS

(71) Applicant: Beijing Xiaomi Mobile Software Co., Ltd., Haidian District, Beijing (CN)

(72) Inventors: Yanbing Lei, Beijing (CN); Jianquan Wang, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 6 days.

(21) Appl. No.: 15/705,283

(22) Filed: Sep. 15, 2017

(65) Prior Publication Data

US 2018/0083355 A1    Mar. 22, 2018

(30) Foreign Application Priority Data

Sep. 20, 2016 (CN) ............................ 2016 1 0835973

(51) Int. Cl.
*H01Q 1/22* (2006.01)
*H01Q 1/52* (2006.01)
(Continued)

(52) U.S. Cl.
CPC ........... *H01Q 1/523* (2013.01); *H01Q 1/2291* (2013.01); *H01Q 9/0407* (2013.01); *H01Q 21/08* (2013.01); *H01Q 21/28* (2013.01); *H04B 7/0413* (2013.01)

(58) Field of Classification Search
None
See application file for complete search history.

(56) References Cited

U.S. PATENT DOCUMENTS 9,571,176 B2   2/2017 Desclos et al.
2004/0125036 A1*  7/2004 Chiang .................... H01Q 1/22
                                                                343/757
(Continued)

FOREIGN PATENT DOCUMENTS

CN    103004018 A    3/2013
CN    104810617 A    7/2015
(Continued)

OTHER PUBLICATIONS

First Office Action in Chinese patent application No. 201610835973. 6, dated Sep. 5, 2018.
(Continued)

*Primary Examiner* — Howard Williams
(74) *Attorney, Agent, or Firm* — Jun He Law Offices P.C.; James J. Zhu

(57) ABSTRACT

The present disclosure provides a device for wireless access, which pertains to the technical field of wireless network. The device for wireless access includes a device body; a radio frequency circuit disposed inside the device body; and a plurality of antenna units disposed on an external surface of the device body, each of the plurality of antenna units being connected to the radio frequency circuit; wherein each of the plurality of antenna units comprises an antenna oscillator, and the antenna oscillators on each two adjacent antenna units of the plurality of antenna units are misaligned with each other. By disposing antenna oscillators of adjacent antenna units on the misaligned regions of the respective antenna unit, the interference of co-frequency signals between adjacent antenna units may be reduced, and the isolation of adjacent antenna units may be enhanced. Thus, adjacent antenna units may be disposed at a reduced distance therebetween. Therefore, it is achievable to have a plurality of co-frequency antennas arranged side by side on a small-
(Continued)

sized device for wireless access, thereby reducing the production cost.

20 Claims, 5 Drawing Sheets

(51) Int. Cl.
*H01Q 21/08* (2006.01)
*H01Q 21/28* (2006.01)
*H01Q 9/04* (2006.01)
*H04B 7/0413* (2017.01)

(56) References Cited

U.S. PATENT DOCUMENTS

| 2008/0094282 | A1 | 4/2008 | Qin |
| 2012/0139793 | A1 | 6/2012 | Sharawi |
| 2013/0082890 | A1* | 4/2013 | Wang ..................... H01Q 1/286 343/770 |

FOREIGN PATENT DOCUMENTS

| CN | 205248454 U | 5/2016 |
| TW | 200820499 A | 5/2008 |
| WO | 2012011796 A1 | 1/2012 |

OTHER PUBLICATIONS

Extended European search report of European Patent Application No. 17191777.6, from the European Patent office, dated Feb. 8, 2018.

Shahab Sanayei et al, "Antenna Selection in MIMO Systems", published on Oct. 31, 2004, IEEE Communications Magazine, pp. 68-73, XP055195637.

Belkin et al, "AC2600 MU-MIMO Gigabit Router User Guide" published on May 7, 2015, pp. 1-13, XP055442910, Retrieved from the Internet: URL:https://www.conetec.su/upload/iblock/f08/Linksys%20EA8500.pdf [retrieved on Jan. 22, 2018].

Tim Higgins, "Linksys EA8500 Max-Stream AC2600 MU-MIMO Smart Wi-Fi Router Reviewed—Part 1—SmallNetBuilder" published on May 14, 2015, XP055443094, Retrieved from the Internet: URL:https://www.smallnetbuilder.com/wireless/wireless-reviews/32711-linksys-ea8500-max-stream-ac2600-mu-mimo-smart-wi-fi-router-reviewed-part-1?tmpl=component&print=1&1ayout=default [retrieved on Jan. 22, 2018].

Office Action issued in corresponding European Application No. 17191777.6 dated Jan. 28, 2019.

Tp-Link: "Tp-Link Archer C3150 User Guide", Aug. 10, 2016, XP055542163, retrieved from the Internet: URL: http://static.tp-link.com/res/down/doc/Archer_C3150(US)_V1_UG.pdf.

Tim Higgins: "Tp-Link AC3150 Wireless MU-MIMO Gigabit Router Reviewed[website]", Aug. 10, 2016,XP055543089.

* cited by examiner

DEVICE FOR WIRELESS ACCESS

CROSS-REFERENCE TO RELATED APPLICATIONS

This application is based upon and claims priority to Chinese Patent Application No. 201610835973.6, filed Sep. 20, 2016, the entire contents thereof are incorporated herein by reference.

TECHNICAL FIELD

The present disclosure generally relates to the technical field of wireless network, and more particularly, to a device for wireless access.

BACKGROUND

With the development of wireless network technology, by externally providing a plurality of co-frequency antennas on a device for wireless access (such as a wireless router) utilizing Multiple-Input Multiple-Output (MIMO) technology, the coverage and network connection speed of the device for wireless access can be improved using the signal superposition effect provided by the plurality of co-frequency antennas.

In the case of a wireless router, for example, in order to ensure that signals from the plurality of co-frequency antennas of the router do not interfere with one another, isolation of adjacent co-frequency antennas is required to be less than −25 dB. Typically, for a general-purpose design, a distance between adjacent co-frequency antennas of a router is required to be larger than one wavelength. For example, when the operating frequency of the co-frequency antennas is 2.45 GHz, one wavelength of the operating frequency in air medium is 122.25 mm. Thus, the distance between adjacent co-frequency antennas of the router is required to be larger than 122.25 mm.

SUMMARY

In order to overcome the problem existing in the related art, the present disclosure provides a device for wireless access. The technical solutions are as follows.

According to one aspect of the embodiments of the present disclosure, there is provided a device for wireless access, including:

a device body; a radio frequency circuit disposed inside the device body; a plurality of antenna units disposed on an external surface of the device body, each of the plurality of antenna units being connected to the radio frequency circuit; wherein each of the plurality of antenna units comprises an antenna oscillator, and the antenna oscillators on each two adjacent antenna units of the plurality of antenna units are misaligned with each other.

By disposing antenna oscillators of adjacent antenna units on the misaligned regions of the respective antenna unit, the isolation of adjacent antenna units may be enhanced. Thus, adjacent antenna units may be disposed at a reduced distance therebetween. Therefore, it is achievable to have a plurality of co-frequency antennas arranged side by side on a small-sized device for wireless access, thereby reducing the production cost.

In an embodiment, the radio frequency circuit comprises a plurality of radio frequency interfaces, and at least two of the plurality of the radio frequency interfaces are cross-connected to at least two of the plurality of antenna units, respectively.

In an embodiment, wherein the plurality of radio frequency interfaces comprises a radio frequency interface 121, a radio frequency interface 122, a radio frequency interface 123 and a radio frequency interface 124 successively disposed in the radio frequency circuit, and wherein the plurality of antenna units includes an antenna unit 11a, an antenna unit 11b, an antenna unit 11c and an antenna unit 11d, and the radio frequency interface 121 is connected to the antenna unit 11a, the radio frequency interface 122 is connected to the antenna unit 11c, the radio frequency interface 123 is connected to the antenna unit 1d and the radio frequency interface 124 is connected to the antenna unit 11b.

By cross-connecting the antenna units with the radio frequency interfaces of the radio frequency circuit, it may further ensure the isolation between different antenna units transmitting signal with the terminal, and improve the performance of the antenna of the device for wireless access In an embodiment, each of the plurality of antenna units is of a plate shaped structure. By the plate shaped structure, it may simplify the production process of the antenna units.

In an embodiment, each antenna oscillator is disposed on a side of the respective antenna unit having a largest surface area out of all sides of the antenna unit.

In an embodiment, the plurality of antenna units comprises a first antenna unit and a second antenna unit located at the outmost of the plurality of antenna units, and at least one third antenna unit between the first antenna unit and the second antenna unit. The first antenna unit and the second antenna unit are disposed along a longitudinal direction, and the at least one third antenna unit is disposed along a lateral direction perpendicular to the longitudinal direction, the lateral direction being substantially a direction along which the plurality of antenna units is disposed. the antenna oscillator of the first antenna unit is disposed on a side of the first antenna unit away from the second antenna unit, the antenna oscillator of the second antenna unit is disposed on a side of the second antenna unit away from the first antenna unit, and the antenna oscillators of each two adjacent ones of the at least one third antenna unit are disposed on opposite sides of the two adjacent third antenna units By disposing different antenna units along different directions, adjacent antenna units may have their antenna oscillators facing different directions, such that adjacent antenna units are orthogonal to each other, further improving the isolation between adjacent antenna units. Moreover, adjacent antenna units may respectively have maximum antenna gains in the direction along which the respective antenna oscillator is facing. Thus, it may improve the coverage of the device for wireless access in various directions and improve the signal quality in various directions.

In an embodiment, the first antenna unit comprises a first insulator disposed on a side of the first antenna unit opposite to the side on which the antenna oscillator of the first antenna unit is disposed, and the first insulator overlaps an entirety of the antenna oscillator of the first antenna unit; and the second antenna unit comprises a second insulator disposed on a side of the second antenna unit opposite to the side on which the antenna oscillator of the second antenna unit is disposed, and the second insulator overlaps an entirety of the antenna oscillator of the second antenna unit.

By providing an insulator at a position opposite to the position of the antenna oscillator on the antenna unit, the equivalent wave length between two adjacent antenna units may be reduced. Thus, isolation between two adjacent antenna units may be guaranteed even with a short distance between them. Then, it is possible to further reduce the distance between two adjacent antenna units of the device for wireless access. In addition, the insulator may have a support effect on the antenna unit for improving the firmness of the antenna unit, such that the antenna unit will not be damaged easily.

In an embodiment, each of the first insulator and the second insulator is made of rubber material. By the rubber material, it may significantly reduce the equivalent wave length between two adjacent antenna units, allowing the adjacent antenna units of the device for wireless access to be disposed at a more reduced distance.

In an embodiment, each of the first insulator and the second insulator has a thickness between 2 mm and 5 mm. For example, each of the first insulator and the second insulator has a thickness of 3 mm. By limiting the thickness of the insulator, it may simplify the production process and make the external appearance of the device for wireless access more coordinated, in addition to achieving reduced distance between adjacent antenna units.

In an embodiment, each of the antenna units has a width between 6 mm and 12 mm. For example, each of the antenna units has a width of 10 mm. By limiting the width of the antenna unit, it may ensure that the structure of the antenna oscillator facilitates the performance of the antenna, and may also simplify the production process. Moreover, the external appearance of the device for wireless access may be designed more coordinated.

In an embodiment, each of the plurality of antenna units is a dual-frequency antenna.

In an embodiment, the number of plurality of the antenna units is 4.

By disposing antenna oscillators of adjacent antenna units on the misaligned regions of the respective antenna unit, the isolation of adjacent antenna units may be enhanced. Thus, adjacent antenna units may be disposed at a reduced distance therebetween. Therefore, it is achievable to have a plurality of co-frequency antennas arranged side by side on a small-sized device for wireless access, thereby reducing the production cost.

In an embodiment, the plurality of antenna units is disposed substantially in a same plane.

In an embodiment, the plurality of antenna units extends substantially a same length from the device body.

It is to be understood that both the foregoing general description and the following detailed description are exemplary only and are not restrictive of the present disclosure.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure.

DETAILED DESCRIPTION

The objectives, technical solutions and advantages of the present disclosure may become more clearly, through a further detailed description given hereinafter to embodiments of the present disclosure in conjunction with the accompanying drawings.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
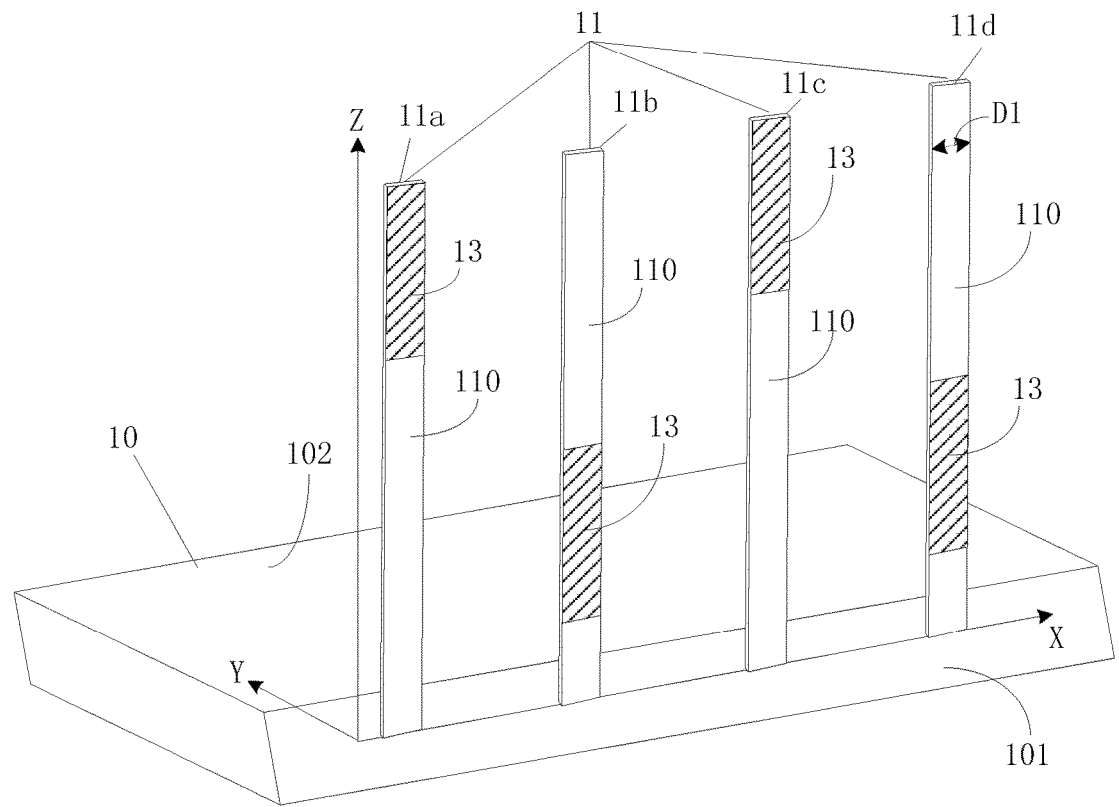
FIG. 1 is a side view of a partial structure of a device for wireless access according to an exemplary embodiment.

FIG. 1 is a side view of a partial structure of a device for wireless access according to an exemplary embodiment. Referring to FIG. 1, the device for wireless access may be a wireless router, an Access Point (AP) device or the like. The device for wireless access includes a device body 10, a plurality of antenna units 11 and a radio frequency circuit (not shown in the figure).

In the embodiment, the antenna units 11 are disposed on an external surface of the device body 10 side by side. The radio frequency circuit is disposed inside the device body 10. Each of the antenna units 11 is connected to the radio frequency circuit.

The external surface of the device body 10 may include four sides 101, one bottom and one top 102. FIG. 1 is merely an example, in which the device body 10 is shown as a cuboid structure, and the antenna units are disposed on a side 101 of the device body 10. However, this is not limited in the embodiment of the present disclosure.

In the embodiment, the number of the antenna units 11 may be four or more than four, such as five, six, seven, eight and so on. In FIG. 1, only four antenna units are shown as an example. However, this is not limited in the embodiment of the present disclosure.

Each of the antenna units 11 may be connected to the external surface of the device body 10 by a rotatable shaft. By the rotatable shaft, the antenna unit 11 may rotate at different angles with respect to a connection point between the antenna unit 11 and the device body 10, such that antenna unit 11 may be disposed perpendicular to or parallel to the top 102 of the device body 10, or the antenna unit 11 may be disposed at an angle to the top 102 of the device body 10. This is not limited in the embodiment of the present disclosure. In FIG. 1, for example, each of the antenna units 11 is shown as perpendicular to the top 102 of the device body 10.

For convenience of explanation, in the embodiments of the present disclosure, the direction along which the antenna units 11 are disposed is referred to as a lateral direction (the direction as shown by an X-axis in FIG. 1), the direction perpendicular to the lateral direction in the side (or the top) where the antenna units 11 are disposed is referred to as a longitudinal direction (the direction as shown by an Y-axis in FIG. 1), and the direction perpendicular to both of the lateral direction and the longitudinal direction is referred to as a Z-axis direction (the direction as shown by an Z-axis in FIG. 1).

Antenna Units

As shown in FIG. 1, each of the antenna units 11 may be a structure of a plate shape. For example, each of the antenna units 11 may be a Printed Circuit Board (PCB). However, the antenna unit 11 may also be a structure of a cylinder shape or an elliptic cylinder shape, and this is not limited in the embodiment of the present disclosure. As an example, FIG. 1 only shows that the antenna unit 11 is a structure of a plate shape. It should be noted that, in a practical production process, each of the antenna units 11 may also be wrapped with a shell of a specified shape to protect the antenna unit.

When the antenna unit 11 is of a plate-shaped structure, surfaces that corresponds to the long edges of the cross section of the antenna unit 11 can be regarded as two sides 110 of the antenna unit 11. It should be noted that, the cross section of the antenna unit 11 may be a polygon, and the two sides 110 may refer to a pair of surfaces of the antenna unit 11 which have large areas and are parallel to each other. Each of the antenna units 11 may have a width D1 between 6 mm and 12 mm. For example, the width of each of the antenna units may be 10 mm. By limiting the width of the antenna unit, it may ensure that the structure of the antenna oscillator facilitates the performance of the antenna, and may also simplify the production process. Moreover, the external appearance of the device for wireless access may be designed more coordinated.

Figure 2:
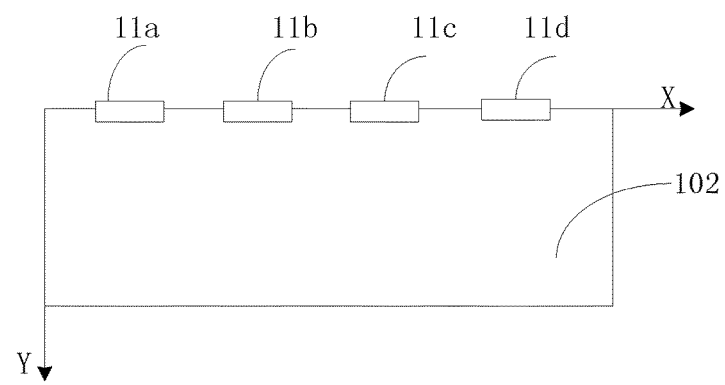
FIG. 2 is a top view of the device for wireless access as shown in FIG. 1.

In the embodiment of the present disclosure, the antenna units 11 arranged along the positive direction of the X-axis are successively referred to as an antenna unit 11a, an antenna unit 11b, an antenna unit 11c and an antenna unit 11d. When the antenna unit 11 is of a plate-shaped structure, each of the antenna units 11 may be disposed along the lateral direction, that is, disposed in a shape of "-" along the X-axis direction as shown in FIG. 1. The four antenna units 11 are arranged in the form of "- - -" as shown in FIG. 1. FIG. 2 is a top view of FIG. 1, and FIG. 2 clearly shows the arrangement of the four antenna units 11 in the form of "- - -".

In the embodiment of the present disclosure, the antenna units 11 have a same height or different heights. In order to simplify the production process and improve the production efficiency, the plurality of antenna units 11 may be designed to have a same height.

Each of the antenna units 11 may be a single-frequency antenna or a multi-frequency antenna. A multi-frequency antenna may be a dual-frequency antenna or a triple-frequency antenna, and so on. This is not limited in the embodiment of the present disclosure. For example, when the multi-frequency antenna is a dual-frequency antenna, for a Wireless Fidelity (WiFi) 2.4G frequency band and a WiFi 5G frequency band, each of the antenna units 11 may support one frequency band (for example, either the 2.4G frequency band or the 5G frequency band) or support two frequency bands simultaneously (for example, both of the 2.4G frequency band and the 5G frequency band).

Antenna Oscillator

Each of the antenna units 11 includes an antenna oscillator 13. Any two adjacent antenna oscillators disposed on respective antenna units are misaligned with each other, and any two non-adjacent antenna oscillators disposed on respective antenna units may be aligned with each other or misaligned with each other. The antenna oscillator 13 may be printed on the antenna unit 11.

By disposing antenna oscillators of adjacent antenna units on the misaligned regions of the respective antenna unit, the interference of co-frequency signals between adjacent antenna units may be reduced, and the isolation of adjacent antenna units may be enhanced. Thus, adjacent antenna units may be disposed at a reduced distance therebetween.

The larger the distance between two adjacent antenna oscillators disposed on respective antenna unit is, the better the isolation effect of the adjacent antenna units can be. Therefore, in practical design process, one of the adjacent antenna oscillators may be disposed as close to the top of the respective antenna unit as possible, and the other antenna oscillator may be disposed as close to the bottom of the respective antenna unit as possible. For example, it is possible to divide one antenna unit 11 into an upper half and a lower half, one of the two adjacent antenna oscillators 13 may be disposed at the upper half of the respective antenna unit 11, and the other antenna oscillator 13 may be disposed at the lower half of the respective antenna unit 11.

When the antenna unit 11 is of a plate-shaped structure, the antenna oscillator 13 may be disposed on a side of the respective antenna unit 11. For the purpose of distinguishing, in the embodiments of the present disclosure, the side of the antenna unit 11 on which the antenna oscillator is disposed is referred to as a first side 110a, and the side opposite to the first side is referred to as a second side 110b.

As shown in FIG. 1, the antenna oscillator of the antenna unit 11a is disposed on the upper half of the first side of the antenna unit 11a. The antenna oscillator of the antenna unit 11b is disposed on the lower half of the first side of the antenna unit 11b. The antenna oscillator of the antenna unit 11c is disposed on the upper half of the first side of the antenna unit 11c. The antenna oscillator of the antenna unit 11d is disposed on the lower half of the first side of the antenna unit 11d.

Each antenna oscillator 13 may be a single-frequency antenna oscillator, and the corresponding antenna unit 11 is a single-frequency antenna. Each antenna oscillator 13 may also be a dual-frequency antenna oscillator, and the corresponding antenna unit 11 is a dual-frequency antenna. This is not limited in the embodiment of the present disclosure.

Figure 3:
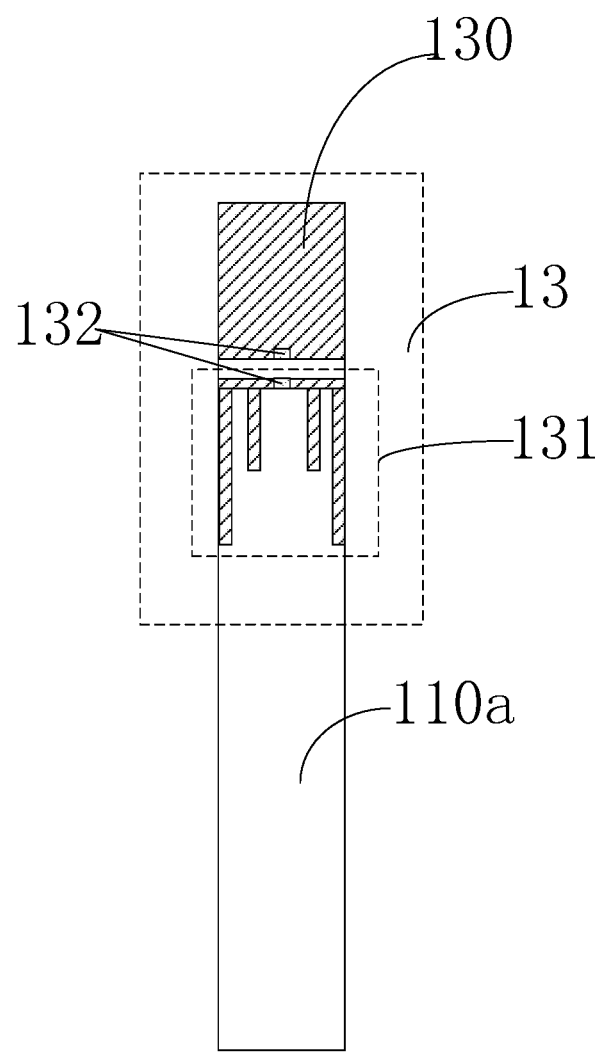
FIG. 3 is a schematic structural diagram of an antenna oscillator according to an exemplary embodiment.

FIG. 3 is a schematic structural diagram of an antenna oscillator according to an exemplary embodiment. The antenna oscillator 13 is a dual-frequency antenna oscillator. Referring to FIG. 3, the antenna oscillator may include a common rectangular area 130 and a claw member 131 with four branches. The claw member 131 includes one horizontal portion and two long vertical portions and two short vertical portions. The two long vertical portions are respectively disposed at outer sides of the two short vertical portions. The two long vertical portions and the horizontal portion constitute an antenna part of WiFi 5G frequency band, and the two short vertical portions and the horizontal portion constitute an antenna part of WiFi 2.4G frequency band. In addition, a feed point 132 may be disposed at a central position of the horizontal portion, and a feed point 132 may be disposed at a central position of the bottom of the common rectangular area 130.

It should be noted that, the antenna oscillator 13 may be of other structure, which is not limited in the embodiment of the present disclosure.

Antenna Units Disposed Along Different Directions

In order to further improve the isolation of adjacent antenna units and reduce distance between adjacent co-frequency antenna units, it is also possible to dispose the antenna units 11 along different directions. In the embodiment of the present disclosure, among the antenna units 11 arranged side by side, the two antenna units located at the outmost are respectively referred to as a first antenna unit and a second antenna unit, and the antenna units disposed between the first antenna unit and the second antenna unit are referred to as third antenna units.

When each of the antenna units 11 is of a plate-shaped structure, the first antenna unit and the second antenna unit are respectively disposed along the longitudinal direction, and the third antenna units are respectively disposed along the lateral direction. The antenna oscillator of the first antenna unit is disposed on the side away from the second antenna unit. The antenna oscillator of the second antenna unit is disposed on the side away from the first antenna unit. Among the third antenna units, antenna oscillators of each two adjacent ones of the third antenna units are disposed on opposite sides of the two adjacent third antenna units.

Figure 4:
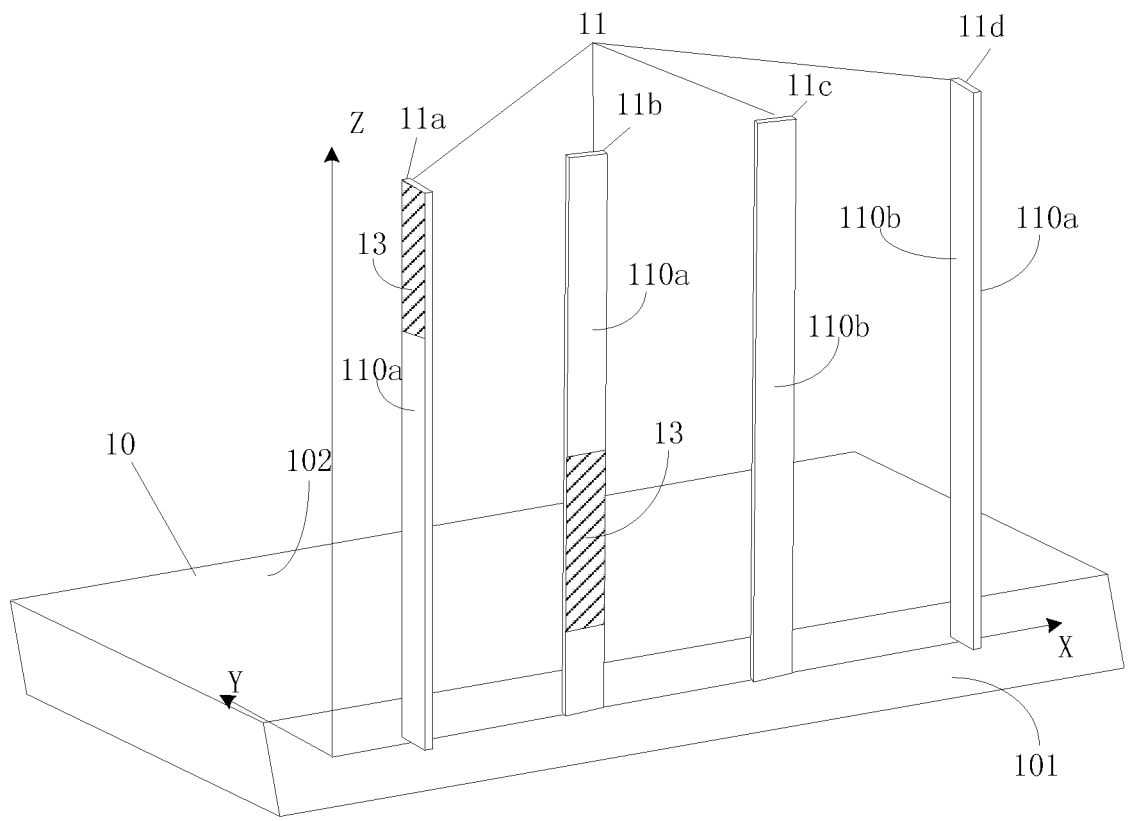
FIG. 4 is a side view of a partial structure of a device for wireless access according to an exemplary embodiment.
Figure 5:
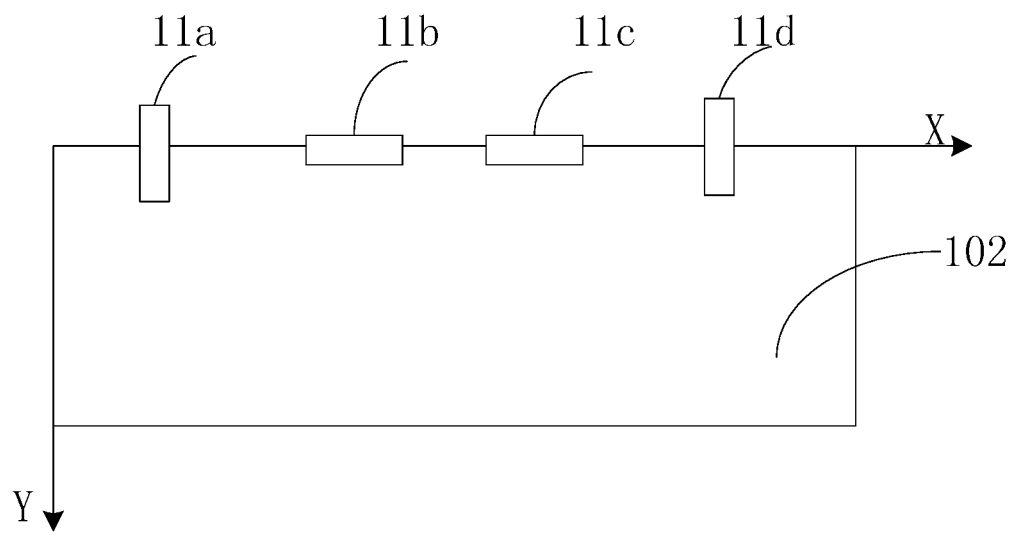
FIG. 5 is a top view of the device for wireless access as shown in FIG. 4.

Again, when there are four antenna units, for example, referring to the side view of the partial structure of the device for wireless access as shown in FIG. 4, the antenna unit 11a (the first antenna unit) and the antenna unit 11d (the second antenna unit) at the outmost are respectively disposed along the longitudinal direction, that is, perpendicular to the X-axis and disposed in a shape of "l". The antenna unit 11b and the antenna unit 11c (the third antenna units) in the middle are respectively disposed along the lateral direction, that is, in the shape of "-". Then, the four antenna units are arranged in the form of "l - - l". FIG. 5 is the top view of FIG. 4, and FIG. 5 clearly shows the arrangement of the four antenna units 11 in the form of "l - - l".

As shown in FIG. 4, the antenna oscillator of the antenna unit 11a is disposed on the left side of the antenna unit 11a (the side indicated by the negative X-axis direction). The antenna oscillator of the antenna unit 11d is disposed on the right side of the antenna unit 11d (the side indicated by the positive X-axis direction). The antenna oscillator of the antenna unit 11b is disposed on the side of the antenna unit 11b indicated by the negative Y-axis direction. The antenna oscillator of the antenna unit 11c is disposed on the side of the antenna unit 11c indicated by the positive Y-axis direction.

By disposing different antenna units along different directions, adjacent antenna units may have their antenna oscillators facing different directions, such that adjacent antenna units are orthogonal to each other, further improving the isolation between adjacent antenna units. Moreover, adjacent antenna units may respectively have maximum antenna gains in the direction along which the respective antenna oscillator is facing. Thus, it may improve the coverage of the device for wireless access in various directions and improve the signal quality in various directions.

Insulators Disposed on the First Antenna Unit and the Second Antenna Unit

In order to further improve the isolation between two adjacent antenna units and thus reduce the distance between two adjacent co-frequency antenna units, a first insulator is disposed on the second side opposite to the first side of the first antenna unit. The first insulator disposed on the second side of the first antenna unit overlaps the entirety of the antenna oscillator disposed on the first side of the first antenna unit. A second insulator is disposed on the second side opposite to the first side of the second antenna unit. The second insulator disposed on the second antenna unit overlaps the entirety of the antenna oscillator disposed on the second antenna unit.

The first insulator on the first antenna unit may be larger than or equal to the antenna oscillator on the first antenna unit. The second insulator on the second antenna unit may be larger than or equal to the antenna oscillator on the second antenna unit.

The first insulator and the second insulator may be made of rubber material. However, the first insulator and the second insulator may be made of other material, which is not limited in the embodiment of the present disclosure. The first insulator and the second insulator each may have a thickness D2 between 2 mm and 5 mm. For example, the first insulator and the second insulator each may have a thickness of 3 mm. It should be noted that, the first insulator and the second insulator may be made of a same material or of different materials, and may have a same thickness or different thicknesses. This is not limited in the embodiment of the present disclosure. Also, it is possible that only one (any one) of the first antenna unit and the second antenna unit includes an insulator. By limiting the thickness of the insulator, it may simplify the production process and make the external appearance of the device for wireless access more coordinated, in addition to achieving reduced distance between adjacent antenna units.

Figure 6:
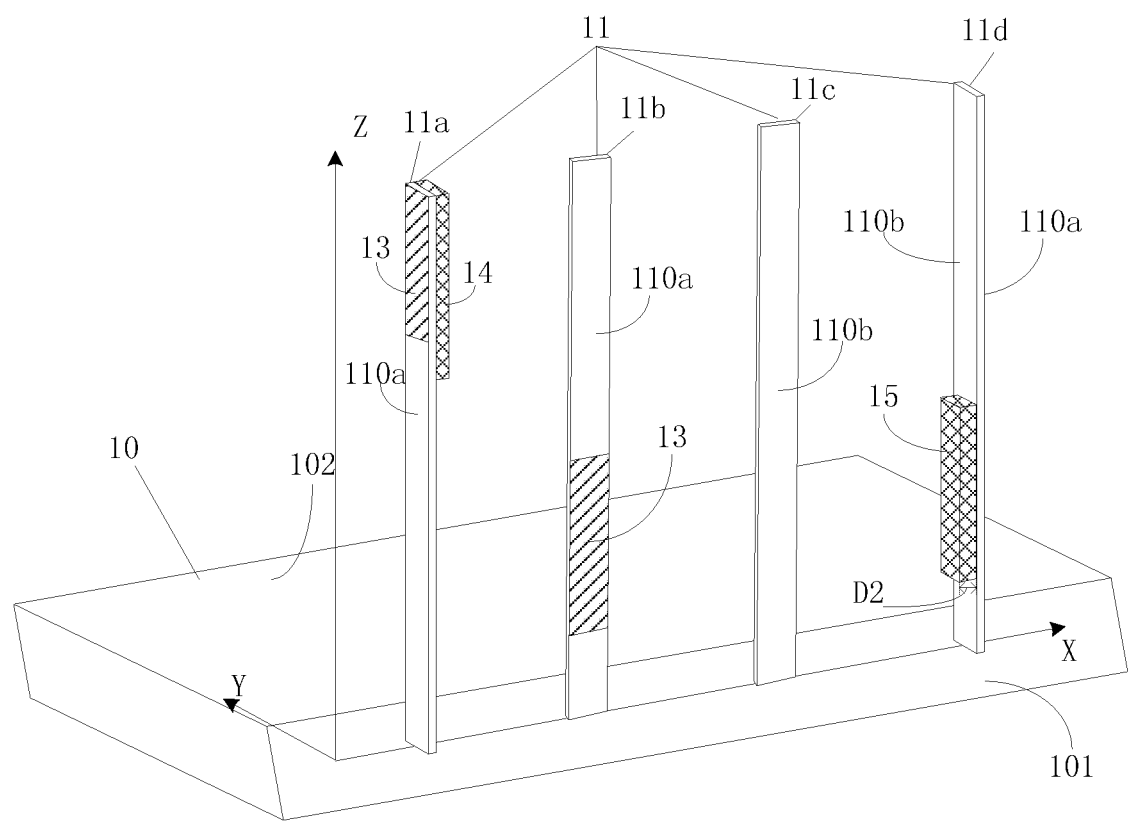
FIG. 6 is a side view of a partial structure of a device for wireless access according to an exemplary embodiment.

Still, when there are four antenna units, for example, as shown in FIG. 6, the antenna unit 11a (the first antenna unit) and the antenna unit 11d (the second antenna unit) include an insulator 14 and an insulator 15 respectively. It can be seen from FIG. 6 that the insulator 14 has a width equal to the width of the antenna unit 11a. On the antenna unit 11a, the insulator 14 on the second side is opposite to the antenna oscillator on the first side. Moreover, it may be seen along the X-axis direction that, the insulator 14 is larger than the antenna oscillator. The insulator 15 is disposed in a manner similar to that of the insulator 14, which will not be repeated herein.

By providing an insulator at a position opposite to the position of the antenna oscillator on the antenna unit, the equivalent wave length between two adjacent antenna units may be reduced. Thus, isolation between two adjacent antenna units may be guaranteed even with a short distance between them. Then, it is possible to further reduce the distance between two adjacent antenna units of the device for wireless access. In addition, the insulator may have a support effect on the antenna unit for improving the firmness of the antenna unit, such that the antenna unit will not be damaged easily.

Radio Frequency Circuit

A radio frequency circuit is disposed on a main board inside the device for wireless access. The radio frequency circuit may include a plurality of radio frequency interfaces. At least two of the radio frequency interfaces are cross-connected to at least two of the antenna units 11.

Figure 7:
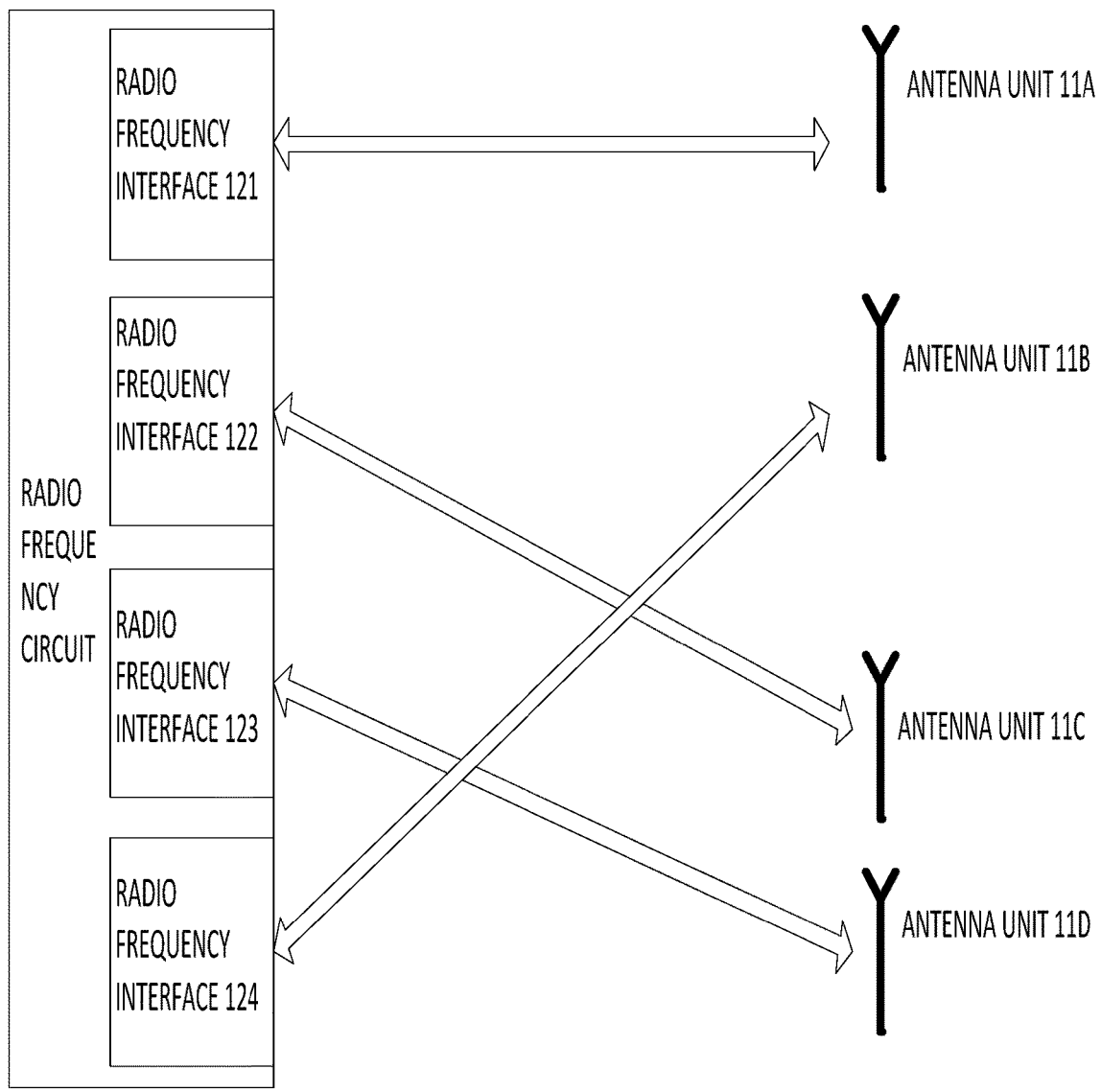
FIG. 7 is a schematic diagram illustrating connections between a radio frequency circuit and antenna units according to an exemplary embodiment.

In the embodiment, the radio frequency interfaces may be connected to the antenna units 11 by a coaxial cable. The number of the radio frequency interfaces may be 4 or more than 4, such as 6, 8, and so on. For example, FIG. 7 is a schematic diagram illustrating connection between a radio frequency circuit and antenna units, wherein there are 4 radio frequency interfaces and 4 antenna units. As shown in FIG. 7, successively from top to bottom of the figure, the 4 radio frequency interfaces are a radio frequency interface 121, a radio frequency interface 122, a radio frequency interface 123 and a radio frequency interface 124. Correspondingly, the arrangement order of the 4 antenna units 11 is the antenna unit 11a, the antenna unit 11b, the antenna unit 11c and the antenna unit 11d. Then, the connection between the 4 radio frequency interfaces and the 4 antenna units may be: the frequency interface 121 is connected to the antenna unit 11a, the frequency interface 122 is connected to the antenna unit 11c, the radio frequency interface 123 is connected to the antenna unit 11d, and the radio frequency interface 124 is connected to the antenna unit 11b.

It should be noted that, in the practical application process, depending on the number of the antenna supported by a terminal, the device for wireless access may select a corresponding number of antennas for signal transmission with the terminal according to the arrangement order of the radio frequency interfaces. For example, when the terminal only supports 1 antenna, the device for wireless access may select one antenna connected to the radio frequency interface 121 for signal transmission. When the terminal supports two antennas, the device for wireless access may select two antennas connected respectively to the radio frequency interface 121 and the radio frequency interface 122 for signal transmission. When the terminal supports three antennas, the device for wireless access may select three antennas connected respectively to the radio frequency interface 121, the radio frequency interface 122 and the radio frequency interface 123 for signal transmission, and so on. In the embodiment, the terminal may be a device supporting wireless function, such as a mobile phone, a tablet computer or the like.

With the connection as shown in FIG. 7, for different numbers of antennas supported by the terminal, the selection of the antenna units for signal transmission with the terminal may be shown as table 1.

TABLE 1

| Number of Antennas Supported by Terminal | Radio Frequency Interface in use | Antenna Unit in use |
| --- | --- | --- |
| 1*1 | Radio Frequency Interface 121 | Antenna Unit 11a |
| 2*2 | Radio Frequency Interfaces 121 and 122 | Antenna Units 11a and 11c |
| 3*3 | Radio Frequency Interfaces 121, 122 and 123 | Antenna Units 11a, 11c and 11d |
| 4*4 | Radio Frequency Interfaces 121, 122, 123 and 124 | Antenna Units 11a, 11b, 11c, and 11d |

In the table, 1*1 denotes that the terminal supports 1 antenna, 2*2 denotes that the terminal supports 2 antennas, 3*3 denotes that the terminal supports 3 antennas, and similarly, 4*4 denotes that the terminal supports 4 antennas.

By cross-connecting the antenna units with the radio frequency interfaces of the radio frequency circuit, it may further ensure the isolation between different antenna units transmitting signal with the terminal, and improve the performance of the antenna of the device for wireless access.

In the embodiment of the present disclosure, in a typical 2.4G WiFi system using a device for wireless access designed in the above manner, the isolation between adjacent co-frequency antennas can be ensured to be less than −25dB, while the distance between two adjacent co-frequency antennas can be less than 60 mm (a length less than one half of a wavelength). Compared to the conventional design, the designed distance between adjacent co-frequency antennas is significantly reduced. It is achievable to have a plurality of co-frequency antennas arranged side by side on a small-sized device for wireless access, thereby reducing the production cost.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A device for wireless access, comprising:
   a device body;
   a radio frequency circuit disposed inside the device body; and
   a plurality of antenna units disposed on an external surface of the device body, each of the plurality of antenna units being connected to the radio frequency circuit;
   wherein each of the plurality of antenna units comprises an antenna oscillator, and the antenna oscillators on each two adjacent antenna units of the plurality of antenna units are misaligned with each other.

2. The device for wireless access of claim 1, wherein the radio frequency circuit comprises a plurality of radio frequency interfaces, and at least two of the plurality of radio frequency interfaces are cross-connected to at least two of the plurality of antenna units, respectively.

3. The device for wireless access of claim 2, wherein the plurality of radio frequency interfaces comprises a first radio frequency interface (121), a second radio frequency interface (122), a third radio frequency interface (123) and a fourth radio frequency interface (124) successively disposed in the radio frequency circuit, and
   wherein the plurality of antenna units comprises a first antenna unit (11a), a second antenna unit (11b), a third antenna unit (11c) and a fourth antenna unit (11d), and the first radio frequency interface (121) is connected to the first antenna unit (11a), the second radio frequency interface (122) is connected to the third antenna unit (11c), the third radio frequency interface (123) is connected to the fourth antenna unit (11d) and the fourth radio frequency interface (124) is connected to the second antenna unit (11b).

4. The device for wireless access of claim 1, wherein each of the plurality of antenna units is of a plate shaped structure.

5. The device for wireless access of claim 4, wherein each antenna oscillator is disposed on a side of the respective antenna unit having a largest surface area out of all sides of the antenna unit.

6. The device for wireless access of claim 5, wherein
   the plurality of antenna units comprises a first antenna unit and a second antenna unit located at the outmost of the plurality of antenna units, and at least one third antenna unit between the first antenna unit and the second antenna unit,
   the first antenna unit and the second antenna unit are disposed along a longitudinal direction, and the at least one third antenna unit is disposed along a lateral direction perpendicular to the longitudinal direction, the lateral direction being substantially a direction along which the plurality of antenna units is disposed; and the antenna oscillator of the first antenna unit is disposed on a side of the first antenna unit away from the second antenna unit, the antenna oscillator of the second antenna unit is disposed on a side of the second antenna unit away from the first antenna unit, and the antenna oscillators of each two adjacent ones of the at least one third antenna unit are disposed on opposite sides of the two adjacent third antenna units.

7. The device for wireless access of claim 6, wherein
the first antenna unit comprises a first insulator disposed on a side of the first antenna unit opposite to the side on which the antenna oscillator of the first antenna unit is disposed, and the first insulator overlaps an entirety of the antenna oscillator of the first antenna unit; and
the second antenna unit comprises a second insulator disposed on a side of the second antenna unit opposite to the side on which the antenna oscillator of the second antenna unit is disposed, and the second insulator overlaps an entirety of the antenna oscillator of the second antenna unit.

8. The device for wireless access of claim 7, wherein each of the first insulator and the second insulator is made of rubber material.

9. The device for wireless access of claim 7, wherein each of the first insulator and the second insulator has a thickness between 2 mm and 5 mm.

10. The device for wireless access of claim 9, wherein each of the first insulator and the second insulator has a thickness of 3 mm.

11. The device for wireless access of claim 6, wherein each of the plurality of antenna units has a width between 6 mm and 12 mm.

12. The device for wireless access of claim 1, wherein
the plurality of antenna units comprises a first antenna unit and a second antenna unit located at the outmost of the plurality of antenna units, and at least one third antenna unit between the first antenna unit and the second antenna unit,
the first antenna unit and the second antenna unit are disposed along a longitudinal direction, and the at least one third antenna unit is disposed along a lateral direction perpendicular to the longitudinal direction, the lateral direction being substantially a direction along which the plurality of antenna units is disposed; and
the antenna oscillator of the first antenna unit is disposed on a side of the first antenna unit away from the second antenna unit, the antenna oscillator of the second antenna unit is disposed on a side of the second antenna unit away from the first antenna unit, and the antenna oscillators of each two adjacent ones of the at least one third antenna unit are disposed on opposite sides of the two adjacent third antenna units.

13. The device for wireless access of claim 12, wherein
the first antenna unit comprises a first insulator disposed on a side of the first antenna unit opposite to the side on which the antenna oscillator of the first antenna unit is disposed, and the first insulator overlaps an entirety of the antenna oscillator of the first antenna unit; and
the second antenna unit comprises a second insulator disposed on a side of the second antenna unit opposite to the side on which the antenna oscillator of the second antenna unit is disposed, and the second insulator overlaps an entirety of the antenna oscillator of the second antenna unit.

14. The device for wireless access of claim 13, wherein each of the first insulator and the second insulator is made of rubber material.

15. The device for wireless access of claim 13, wherein each of the first insulator and the second insulator has a thickness between 2 mm and 5 mm.

16. The device for wireless access of claim 15, wherein each of the first insulator and the second insulator has a thickness of 3 mm.

17. The device for wireless access of claim 12, wherein each of the plurality of antenna units has a width between 6 mm and 12 mm.

18. The device for wireless access of claim 1, wherein each of the plurality of antenna units is a single-frequency antenna or a multi-frequency antenna.

19. The device for wireless access of claim 1, wherein the plurality of antenna units is disposed substantially in a same plane.

20. The device for wireless access of claim 1, wherein the plurality of antenna units extends substantially a same length from the device body.

* * * * *